United States Patent [19]

Rippingale

[11] Patent Number: 4,818,944
[45] Date of Patent: Apr. 4, 1989

[54] MAGNETIC LOCATING AND TRACING SYSTEM AND METHOD USNIG DUAL-ANTENNA TRANSMITTER TO DISTINGUISH BETWEEN CONCEALED ADJACENT OBJECTS

[75] Inventor: John B. Rippingale, Leesburg, Va.

[73] Assignee: Schonstedt Instrument Company, Reston, Va.

[21] Appl. No.: 46,463

[22] Filed: May 6, 1987

[51] Int. Cl.$^4$ ............... G01R 19/00; G01V 3/08; G01V 3/10
[52] U.S. Cl. ............................. 324/326; 324/67
[58] Field of Search ............... 324/66, 67, 326–329

[56] References Cited

U.S. PATENT DOCUMENTS

| 2,966,627 | 12/1960 | Hawkins | 324/1 |
|---|---|---|---|
| 3,076,931 | 2/1963 | Jasper | 324/66 |
| 3,471,772 | 10/1969 | Smith | 324/3 |
| 3,492,564 | 1/1970 | Baker, Jr. | 324/3 |
| 3,617,865 | 4/1971 | Hakata | 324/3 |
| 3,907,136 | 9/1975 | Christides et al. | 214/138 |
| 4,085,360 | 4/1978 | Howell | 324/3 |
| 4,091,322 | 5/1978 | Stankoff | 324/3 |
| 4,112,349 | 9/1978 | Weber | 324/3 |
| 4,118,662 | 10/1978 | Weber | 324/3 |
| 4,161,686 | 7/1979 | Weber | 324/3 |
| 4,295,095 | 10/1981 | Thomas et al. | 324/326 |
| 4,390,836 | 6/1983 | Bruce et al. | 324/54 |
| 4,427,942 | 11/1984 | Sole | 324/326 |
| 4,486,712 | 12/1984 | Weber | 324/329 |

FOREIGN PATENT DOCUMENTS 2096769 10/1982 United Kingdom .

Primary Examiner—Reinhard J. Eizenzopf
Assistant Examiner—Walter E. Snow
Attorney, Agent, or Firm—Shapiro and Shapiro

[57] ABSTRACT

Locating and tracing of a concealed, elongated, conductive object, such as a buried pipe or cable, is enhanced, when a second such object is adjacent to the first, by employing a transmitter having a pair of antennae that induce distinguishable currents in the respective objects. A receiver movable with respect to the transmitter and with respect to the objects produces an output signal dependent upon the sensing of fields associated with both currents. The position of the transmitter relative to the objects is adjusted to optimize the output signal.

24 Claims, 3 Drawing Sheets

MAGNETIC LOCATING AND TRACING SYSTEM AND METHOD USING DUAL-ANTENNA TRANSMITTER TO DISTINGUISH BETWEEN CONCEALED ADJACENT OBJECTS

BACKGROUND OF THE INVENTION

This invention is concerned with locating and tracing concealed elongated conductive objects, such as pipes or cables, and is more particularly concerned with improved locating and tracing of a first object when a second object is adjacent to the first.

In the prior art, there are two general techniques of locating buried metallic objects. A passive technique employs a gradiometer or the like as a magnetic locator for detecting the presence of ferrous metal objects, such as iron and steel pipes, iron markers, manhole covers, well casings, etc. An active technique uses a transmitter to induce alternating currents in non-ferrous metal pipes, power cables, or communication cables, for example, and a receiver to sense magnetic fields associated with the currents.

The model MAC-51B Magnetic and Cable Locator manufactured by the assignee of the present invention is designed for selective active or passive use. When apparatus of this type is employed to locate and trace a cable (or non-ferrous pipe), for example, a transmitter may be disposed on the ground at a position close to the location (or suspected location) of a portion of the cable so as to induce an alternating current therein that may be traced by moving a receiver back and forth over the ground. When there are no interfering objects close to the cable being traced, this system works admirably, producing a distinct single null in the output signal of the receiver when the receiver is located directly over the cable and is oriented so as to sense a vertical component of a circumferential magnetic field associated with the current in the cable. When, however, another cable (or pipe) is present adjacent to the first cable, e.g., within a few feet of the first cable and extending in the same general direction, the single null output signal characteristic of the receiver becomes distorted, and tracing of the desired cable may become difficult.

BRIEF DESCRIPTION OF THE INVENTION

The present invention provides a system and method that improves substantially the ease and accuracy of locating and tracing of one concealed object, such as a buried pipe or cable, in the presence of an adjacent object.

In one of the broader aspects of the invention, a system for locating at least one of a pair of concealed, elongated, conductive, adjacent objects, comprises, in combination, a transmitter and a receiver, said transmitter having means including a pair of antennae for inducing a pair of distinguishable alternating currents in said objects, respectively, said receiver being movable relative to said transmitter and to said objects, having means for sensing magnetic fields associated with said currents, respectively, and having means for producing an output signal dependent upon the sensing of both of said fields.

In another of the broader aspects of the invention, a method of locating at least one of a pair of concealed, elongated, conductive, adjacent objects comprises producing in said objects a pair of distinguishable alternating currents, respectively, moving with respect to said objects a receiver sensitive to a pair of magnetic fields associated with said currents, respectively, and producing an output signal from said receiver dependent upon the sensing by said receiver of both of said fields.

BRIEF DESCRIPTION OF THE DRAWINGS

The invention will be further described in conjunction with the accompanying drawings which illustrate preferred (best mode) embodiments, and wherein.

DESCRIPTION OF PREFERRED EMBODIMENTS

Figure 1:
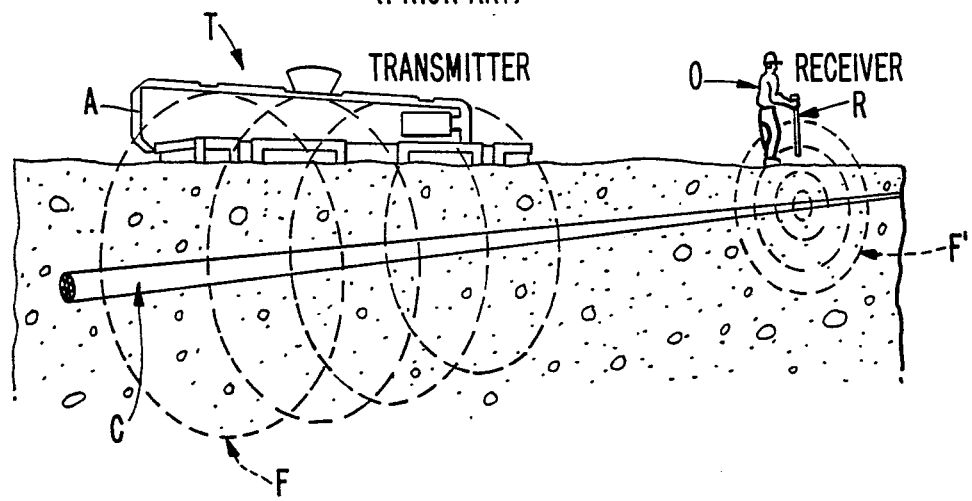
FIGS. 1 and 2 are diagrammatic views illustrating the use of prior art apparatus in locating and tracing a buried cable.

FIG. 1 illustrates, diagrammatically, the use of the aforesaid model MAC-51B Cable Locator to locate and trace a buried cable (or pipe) C. A transmitter T with a loop antenna A is placed on the ground over a portion of the cable C (a portion that is known or located experimentally) and generates an electromagnetic field F that is coupled to the cable C and that induces in the cable an alternating current. The current has a circumferential field F' associated therewith that is sensed by a receiver R moved back and forth over the ground by an operator O. Apparatus of this type is well known and need not be described in detail.

Figure 2:
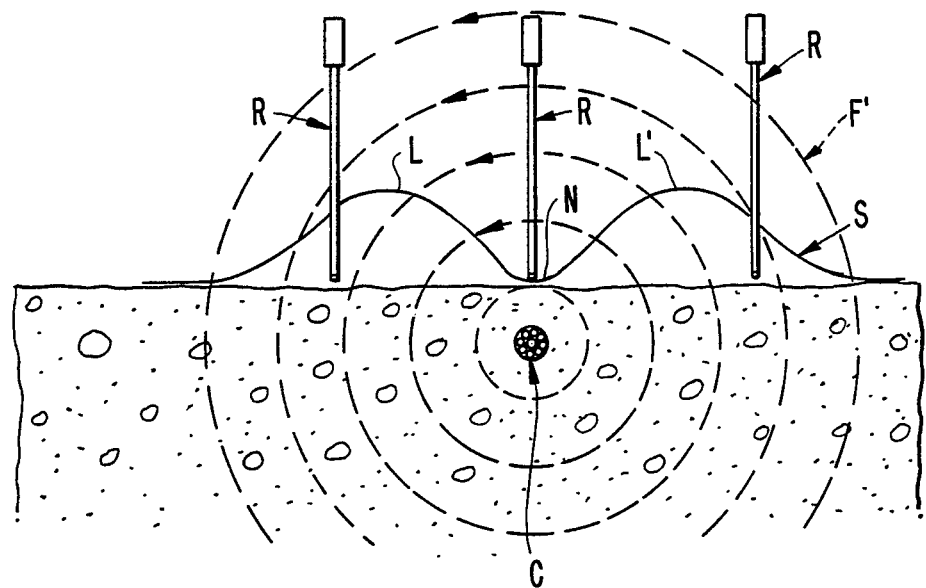

As shown in FIG. 2, in which the cable C extends perpendicular to the plane of the drawing, when the receiver R is held vertically (so as to sense a vertical component of the field F') and is moved back and forth across the cable C (three positions of the receiver being illustrated), an output signal characteristic S is produced having a null N directly over the cable and two lobes L and L' at opposite sides of the cable. By sweeping the receiver back and forth across the cable while moving along the general direction of the cable, the position of the cable may be readily traced.

Figure 3:
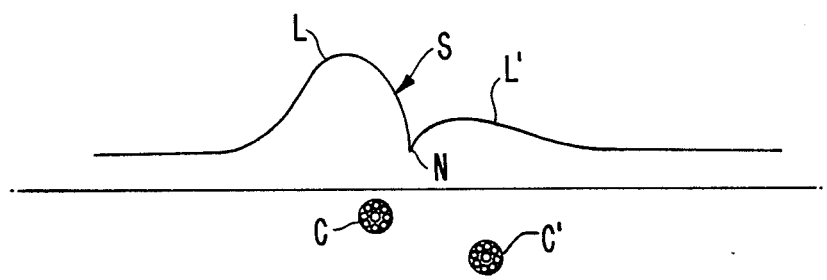
FIG. 3 is a diagrammatic view illustrating an output signal characteristic when a prior art receiver encounters a pair of adjacent cables (or pipes)

When a second cable (or pipe) C' is present adjacent to the first as shown in FIG. 3, the output signal characteristic S may be distorted so that the null N is located between the cables and one of the side lobes has a substantially greater amplitude than the other. The configuration of the output signal characteristic depends, for example, upon the depth of the second cable C' relative to the first cable C, the distance between the cables, and their relative size and conductivity. Thus, when two cables are present, running generally in the same direction, tracing of the desired cable may become difficult. The present invention alleviates this problem to a substantial degree, as will now be described.

Figure 4:
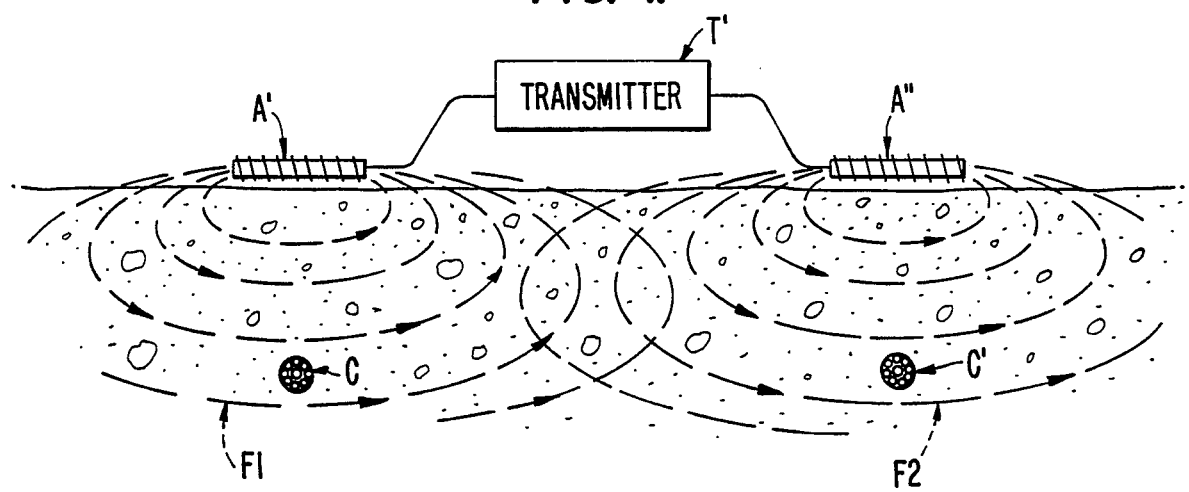
FIG. 4 is a diagrammatic view illustrating transmitting apparatus in accordance with the invention.
Figure 11:
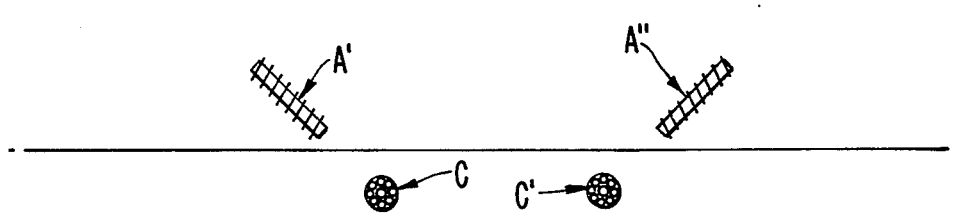
FIG. 11 is a diagrammatic view illustrating a modification of transmitting antennae orientation.

As shown in FIG. 4, the invention employs a transmitter T' having a pair of antennae A' and A" that are preferably spaced a few feet apart (say 3–5 feet), that are driven by RF signals, and that generate corresponding magnetic fields F1 and F2. Each of the antennae A' and A" may comprise 100 turns of No. 14 wire wound on a ¼ inch by 8 inch ferrite rod, for example. As described in more detail hereinafter, the signals that drive the antennae are distinguishable, and the fields F1 and F2 induce corresponding distinguishable currents in cables C and C', respectively. As shown in FIG. 11, the orientation of the antennae may be changed from the horizontal orientation shown in FIG. 4 to enhance the inducement of currents in the respective cables.

Figure 5:
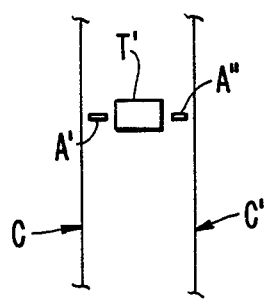
FIG. 5 is a diagrammatic view illustrating an optimum position of the transmitting apparatus with respect to a pair of buried pipes or cables.

The transmitting apparatus is optimally positioned relative to the cables as shown in FIG. 5. Sometimes sufficient information as to the location of at least part of the cables is available to permit such positioning initially. At other times, however, such information is not available, and the transmitting apparatus may be initially positioned as shown FIG. 7, i.e., centered over one of the cables, or even completely beside the cables. Usually, sufficient information is available to determine at least the approximate location of a portion of a cable (or pipe) to be located and traced. After initial tracing, using a receiver R of the type referred to earlier, for example, the position of the transmitter may be moved to the position of FIG. 5 to optimize further tracing operations.

Figure 6:
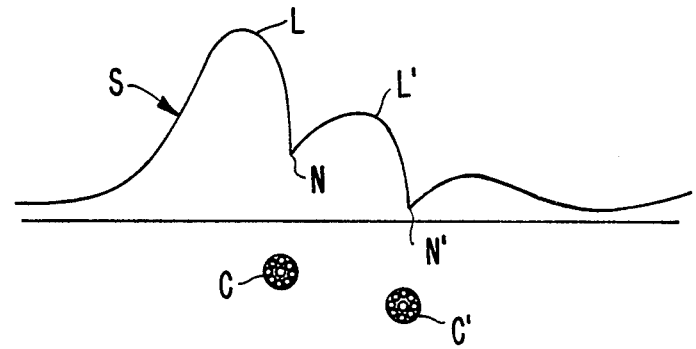
FIG. 6 is a view similar to FIG. 3 and illustrating an improvement in the output signal characteristic due to the invention.

As described hereinafter in more detail, the system of the invention is capable of producing two distinct output signal nulls N and N' over respective cables C and C', as shown in FIG. 6. It is thus possible to locate and trace one of the cables (or even both cables) more easily and accurately than with prior art systems and methods. As is apparent in FIG. 6, lobes L and L' are located at opposite sides of the cable C, and although these lobes may have different amplitudes, the null N is readily perceived.

Figure 7:
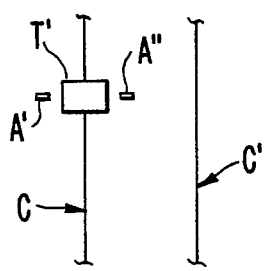
FIG. 7 is a view similar to FIG. 5 but illustrating the transmitting apparatus in a non-optimum position.
Figure 8:
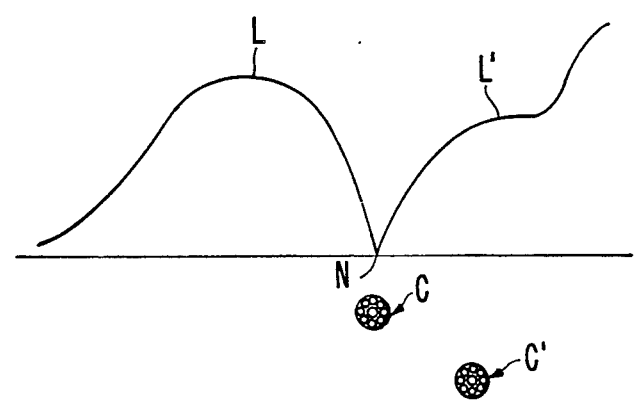
FIG. 8 is a view similar to FIG. 6 and illustrating the output signal characteristic for the disposition of the transmitting apparatus in FIG. 7.

When the transmitting apparatus is located as shown in FIG. 7, the output signal characteristic may have the configuration shown in FIG. 8, in which one of the lobes L', is substantially distorted. By moving the location of the transmitting apparatus in the direction of the distorted lobe L', it is possible to arrive at the position shown in FIG. 5 and to produce an output signal having the characteristic shown in FIG. 6. The output signal characteristics shown in FIGS. 6 and 8 may be shifted upwardly or downwardly with respect to a base line by adjustment of a receiver deadband control, for example.

When the receiver R is employed to trace a cable C in the presence of an adjacent cable C', the receiver will normally be swept back and forth across both cables to facilitate the desired positioning of the transmitter and to monitor the total output signal characteristic as the receiver is moved in the general direction of the cable(s) to be traced. In accordance with the invention, output signal characteristics of the type shown in FIGS. 6 and 8 are produced only when the receiver senses both fields associated with the currents in the respective cables, which are distinguishable. Among the techniques that may be employed to make the currents distinguishable from one another and to produce an output signal dependent upon the presence of both currents are: (1) currents having different carrier frequencies that may be combined to produce a beat frequency, (2) currents having the same carrier frequency amplitude-modulated by different frequencies that may be combined to produce a beat frequency, and (3) currents that are pulsed at different repetition rates that may be combined to produce a beat frequency. Other techniques may also be employed to distinguish the currents in the respective cables and to produce an output signal dependent upon the presence of both currents.

Figure 9:
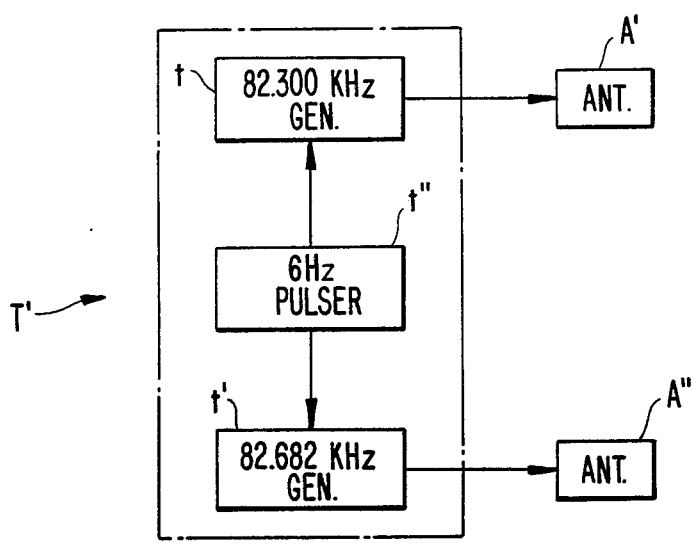
FIG. 9 is a block diagram of transmitting apparatus employed in the invention.

As shown in FIG. 9, in a first embodiment the transmitter T' has carrier generators t and t' that produce sinusoidal carrier currents of 82.300 KHz and 82.682 KHz, for example, which drive antenna A' and A", respectively. The carrier frequencies when detected in the receiver R, will produce a beat frequency signal of 382 Hz. To produce a pulsating audio output signal which is easier for the operator to distinguish from background noise than a steady tone, each of the carrier frequencies may be pulsed on and off at a 6 Hz rate, for example, by a pulse generator t".

Figure 10:
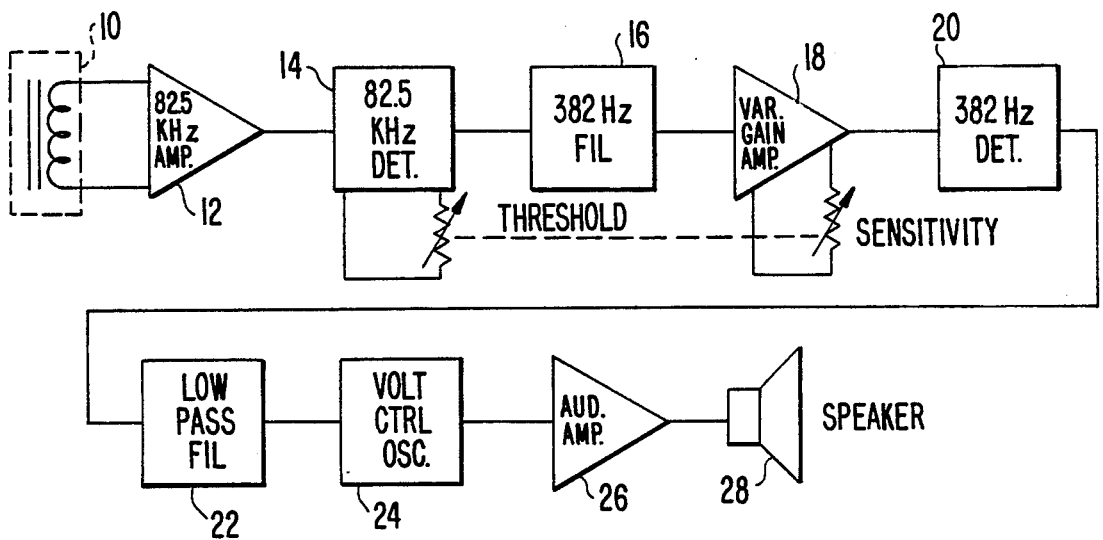
FIG. 10 is a block diagram of receiving apparatus employed in the invention.

FIG. 10 illustrates a typical receiver employed in the invention (which may be similar to the receiver of the model MAC-51B Magnetic and Cable Locator referred to earlier). The fields associated with the currents in the cables C and C', for example, are sensed by a sensor coil 10 (which may be wound upon a ferrite core) producing a combined signal that is supplied to an 82.5 KHz amplifier 12. The amplified signal is detected in an 82.5 KHz detector (demodulator) 14. The amplifier 12 amplifies both the 82.300 KHz and the 82.682 KHz carrier components in the combined signal from coil 12, and the detector 14 (a non-linear circuit) detects the envelope of the amplified signal and produces a 382 Hz beat frequency signal (pulsating at 6 Hz) when both components are present. A filter 16 passes the 382 Hz beat frequency signal to a variable gain amplifier 18, and the amplified beat frequency signal is applied to a 382 Hz detector 20. A 6 Hz pulsating signal from detector 20 (a non-linear circuit) is passed by a low pass filter 22 to a voltage controlled oscillator 24, which produces a variable frequency signal that is amplified by an audio amplifier 26 to produce a pulsating output signal that is supplied to a speaker 28.

If, instead of using different carrier frequencies to drive the respective antennae A' and A", the same carrier frequency is used, both currents may be amplitude modulated by the same 382 Hz modulation frequency but pulsed at different and asynchronous pulse rates, such as 20.12 Hz for one antenna and 23.87 Hz for the other. The two signals will blend in the receiver and produce 20.12 Hz or 23.87 Hz pulsations of a 382 Hz signal at the output of detector 20 when a signal from only one cable is present and will produce a beat frequency signal of 3.75 Hz at the output of detector 20 when signals from both cables are present. Thus, if the low pass filter 22 is set to reject frequencies above 4 Hz, for example, an output signal from the speaker 28 will only be produced when currents in both cables are sensed by the receiver.

As a further alternative, the same 82.5 KHz carrier (pulsed on and off at 6 Hz, for example) may be employed for both antennae but modulated at 1288 Hz and 906 Hz, respectively, which will produce a pulsating beat frequency signal of 382 Hz at the output of detector 14 when the currents in both cables are sensed. This signal may be processed as in the first embodiment.

The invention is especially useful in an environment in which the horizontal separation s between the cables is related to the depth d of the cable to be located and traced in accordance with the relationship $s<1\frac{1}{2}d$. The effect achieved by the invention is enhanced by the fact that the field from the transmitter, and hence the excitation at a cable, decreases by the inverse cube of the distance between an antennae and a cable. For example, if the cables and the antennae were each separated horizontally by 3 feet and the cables were buried 3 feet, then a signal due to a given antenna in a cable under that antenna would be 2.8 times stronger than a signal due to that antenna in a cable 3 feet to one side of the antenna. This phenomenon substantially reduces the inducement of currents from both antennae in the same cable when the transmitter is properly positioned. It also enhances the desired performance of the receiver, which may be optimized by adjustment of a threshold sensitivity control (indicated in FIG. 10).

While preferred embodiments of the invention have been shown and described, it will be apparent to those skilled in the art that changes can be made in these embodiments without departing from the principles and spirit of the invention, the scope of which is defined in the appended claims. For example, the transmitter may be designed so that only one of the antennae may be energized (e.g., by a modulated 82.5 KHz carrier as in the aforesaid Model MAC-51B) for cable locating and tracing when only a single cable is present.

The invention claimed is:

1. A system for locating at least one of a pair of concealed, elongated, conductive, adjacent objects, comprising, in combination, a transmitter and a receiver, said transmitter having means including a pair of spaced antennae for generating electromagnetic fields coupled to said objects for inducing a pair of distinguishable alternating currents in said objects, respectively said receiver being movable relative to said transmitter and to said objects, having means for sensing magnetic fields associated with said currents, respectively, and having means for producing an output signal dependent upon the sensing of both of said fields associated with said currents.

2. A system in accordance with claim 1, wherein said currents have different carrier frequencies.

3. A system in accordance with claim 1, wherein said currents are pulsed at different pulsation rates.

4. A system in accordance with claim 1, wherein said currents have the same carrier frequency but different modulation frequencies.

5. A system in accordance with claim 1, wherein said output signal producing means comprises means for producing a beat frequency signal related to said currents.

6. A system in accordance with claim 1, wherein said antennae are separated horizontally by about 3–5 feet.

7. A system in accordance with claim 1, wherein said sensing means comprises a coil for sensing both of said magnetic fields associated with said currents and for producing a combined signal, and wherein said output signal producing means produces said output signal only when said combined signal is present.

8. A system in accordance with claim 7, wherein said currents have different carrier frequencies and said combined signal has components corresponding to said different carrier frequencies, respectively, and wherein said output signal producing means produces a beat frequency signal from said components.

9. A system in accordance with claim 7, wherein said currents have different pulsation rates and said combined signal has components corresponding to said different pulsation rates, respectively, and wherein said output signal producing means produces a beat frequency signal from said components.

10. A system in accordance with claim 7, wherein said currents have different modulation frequencies and said combined signal has components corresponding to said different modulation frequencies, respectively, and wherein said output signal producing means produces a beat frequency signal from said components.

11. A system in accordance with claim 1, wherein said output signal producing means produces said output signal only upon the sensing of both of said fields associated with said currents.

12. A method of locating at least one of a pair of concealed, elongated, conductive, adjacent objects, comprising, producing in said objects a pair of distinguishable alternating currents, respectively, moving with respect to said objects a receiver sensitive to a pair of magnetic fields associated with said currents, respectively, and producing an output signal from said receiver dependent upon the sensing by said receiver of both of said fields, and only when both of said fields are present.

13. A method in accordance with claim 12, wherein said output signal is produced in response to a beat frequency signal generated by the sensing of both of said magnetic fields.

14. A method in accordance with claim 12 wherein said currents are induced in said objects by a pair of antennae.

15. A method in accordance with claim 12, wherein said currents have different carrier frequencies.

16. A method in accordance with claim 12 wherein said currents are pulsed at different pulsation rates.

17. A method in accordance with claim 12 wherein said currents have the same carrier frequency modulated at different frequencies.

18. A method in accordance with claim 12 wherein said receiver is moved back and forth transversely of said objects and is also moved longitudinally of said objects.

19. A method in accordance with claim 18, wherein said output signal from said receiver is produced by sensing said magnetic fields in a sensor coil, producing a combined signal from said coil that includes components corresponding to said magnetic fields, and producing a beat frequency signal from said components.

20. A method in accordance with claim 19, wherein said components have different carrier frequencies.

21. A method in accordance with claim 19, wherein said components have different pulsation rates.

22. A method in accordance with claim 19 wherein said components have different modulation frequencies.

23. A method of locating at least one of a pair of concealed, elongated, conductive, adjacent objects, comprising, producing in said objects a pair of distinguishable alternating currents, respectively, moving with respect to said objects as receiver sensitive to a pair of magnetic fields associated with said currents, respectively, and producing an output signal from said receiver dependent upon the sensing by said receiver of both of said fields, said currents being inducted in said objects by a transmitter that is positioned over said objects and that is provided with a pair of spaced antennae and said receiver being moved relative to said transmitter.

24. A method in accordance with claim 23, wherein the position of said transmitter relative to said objects is adjusted to optimize the sensing of said fields by said receiver.

* * * * *